Feb. 2, 1932.    W. R. KIMBALL    1,843,643
AERONAUTICAL DEVICE
Filed Nov. 5, 1929    5 Sheets-Sheet 1

Inventor
Wilbur R. Kimball
By his Attorney
Thomas A. Hill

Feb. 2, 1932. W. R. KIMBALL 1,843,643
AERONAUTICAL DEVICE
Filed Nov. 5, 1929 5 Sheets-Sheet 2

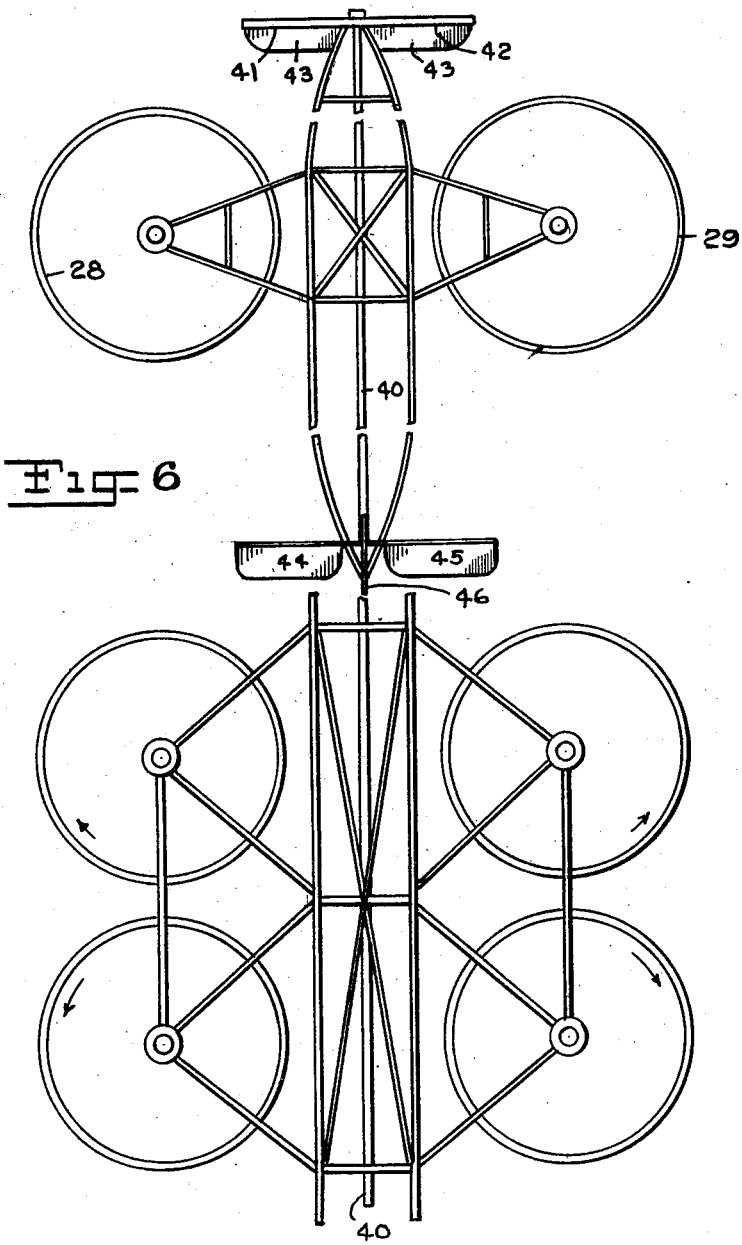

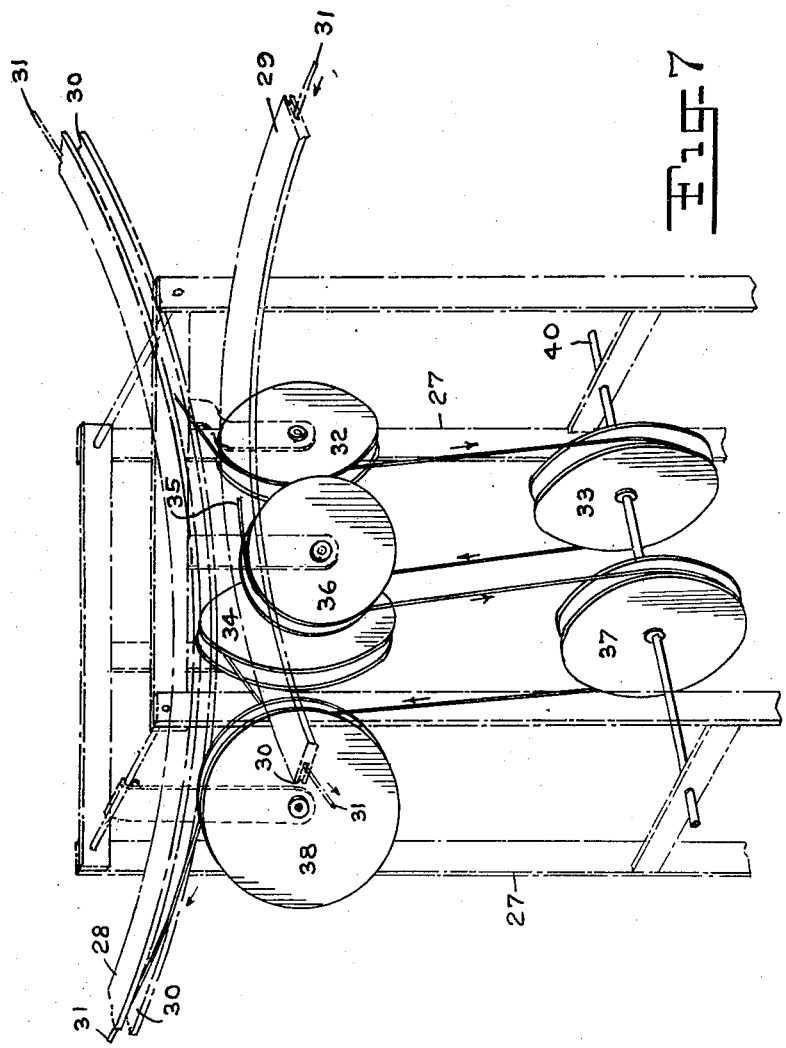

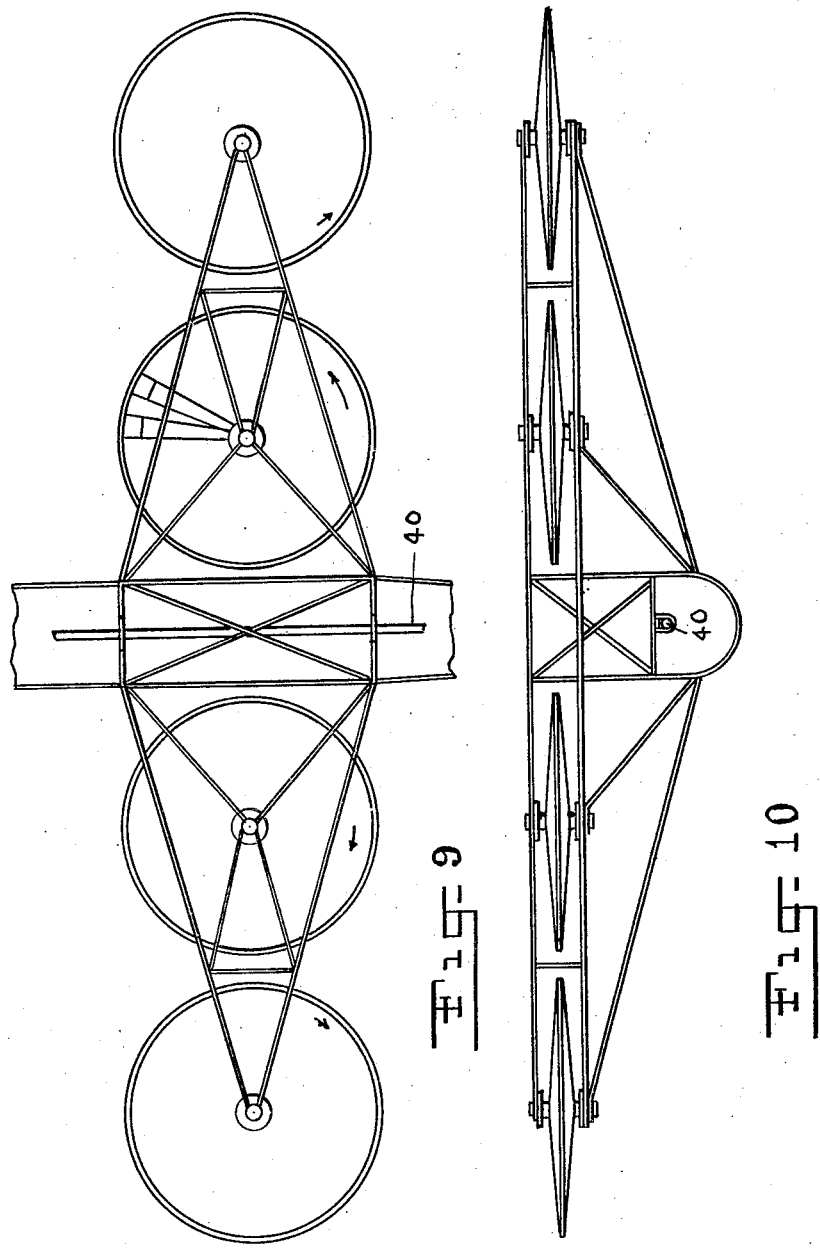

Patented Feb. 2, 1932

1,843,643

UNITED STATES PATENT OFFICE

WILBUR R. KIMBALL, OF NEW YORK, N. Y.

AERONAUTICAL DEVICE

Application filed November 5, 1929. Serial No. 404,935.

My invention relates to improvements in propellers or equivalent devices for operating upon the air such as commonly understood in connection with helicopters, and more particularly has reference to means in combination with an air propeller and flying machine, for checking the reverse motion of the propeller such as during accidental descent of a helicopter. The lifting propeller or propellers of a helicopter are rotated in such a manner that the blades thereof are presented at a positive angle of incidence to the air, thus producing a lifting or sustaining effect upon the machine, but should be free to rotate in the reverse direction in the event of accidental or forced descent of the machine, such as when the motor stops. One of the principal objects of my invention is to provide means in combination with such a propeller or a helicopter for reversing the angle of incidence of one or more of the propeller blades when rotated oppositely by the on-rush of air during descent, thus converting the propeller or part thereof into a wind motor which impels other blades of reverse angle of incidence against this on-rush of air, thus effectively retarding or checking the rapid descent of the machine or helicopter to which the propeller is attached.

Figure 1:
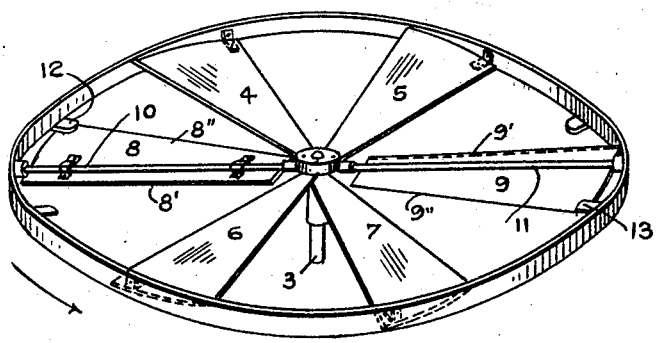
Figure 2:
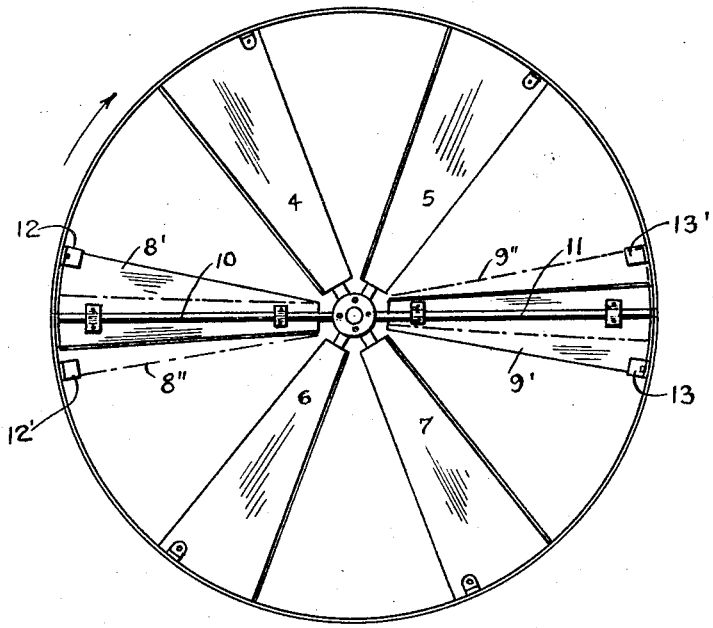
Figure 3:
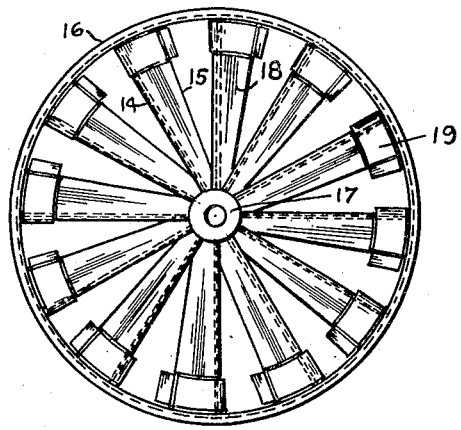
Figure 4:
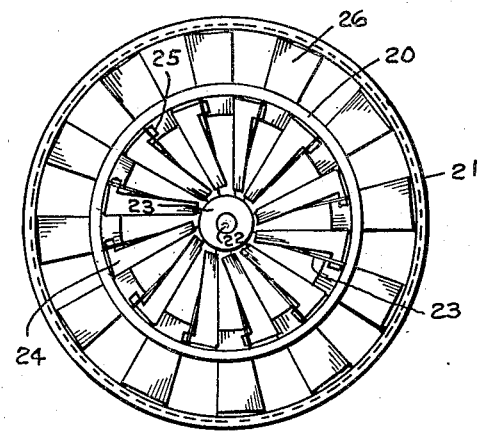

Referring to the accompanying drawings, I have illustrated in Fig. 1, in perspective, a suitable form of propeller or impelling device embodying an application of my invention, and showing the position of the blades when lifting or sustaining the machine. In Fig. 2 I have illustrated in plan view the position of the blades, two of which have changed the angle of incidence to check the descent of the machine as aforesaid. Fig. 3 illustrates in plan view a modified arrangement of wheel or propeller, and Fig. 4 illustrates in plan view a double decked form, shown to advantage in side elevation in Fig. 5. Fig. 6 shows an arrangement of two such wheels or propellers in plan view at opposite sides of the chassis of a helicopter machine, and Fig. 7 illustrates in perspective, parts broken away, a suitable cable driving mechanism therefor. Fig. 8 illustrates a four wheel or propeller arrangement of helicopter machine, two abreast. Fig. 9 illustrates another four wheeled or propellered arrangement in plan view, and Fig. 10 an end elevation of the same.

Referring now more particularly to Figs. 1 and 2, 3 indicates the usual propeller shaft. 4, 5, 6 and 7 the fixed propeller blades at a positive or lifting angle of incidence when the propeller turns to lift, anti-clockwise as indicated by the arrow, the blades 8 and 9 being in similar position though mounted to turn upon the axis 10 and 11. When rotating to lift the machine the air impinges beneath the leading edges 8', 9', holding the trailing edges 8" and 9" up against the flanges or projections 12, 13. But in case of accident to the motor the upward rush of air against the blades 4 to 7 inclusive reverses the rotation of the propeller in the direction indicated by the arrow in Fig. 2, so that what was the trailing edges of the blades 4 to 7 inclusive now becomes the leading edges, these blades serving as a screw cutting downward through the air. This reverse rotation of the propeller, however, reverses the blades 8, 9 upon their axes and presents the same at a positive angle of incidence to the air in opposition to the action of the blades 4 to 7 inclusive. In other words, the trailing edges 8" and 9" now swing under the axis 10, 11 at the reverse sides of the blades. The leading edges 8', 9' compressing the air beneath the reverse sides of the blades and retarding the rotation of the propeller as a whole, the trailing sides of the blades engaging beneath the clips or projection 12' and 13'.

Of course any number of the blades may be mounted to swing freely upon pivoted axis, or other suitable means may be provided for automatically changing their angles of incidence and, of course, any suitable means may be employed other than the clips or projections such as 12 or 13 for retaining these movable blades in correct position whether operating normally or under adverse conditions.

In the form of wheel shown in Fig. 3 spokes 14, 15 are arranged in pairs, extending from points in the same plane from the outer ring 16, to points above and below on the hub 17, and each pair of spokes is spanned by fabric 18, forming a propeller blade-like surface, the inner or hub end of the blade being higher on the hub 17 in the direction of rotation when the wheel or propeller is lifting, thus giving a desirable variable pitch, increasing from the periphery to the hub.

The fabric 18 spanning between the spokes does not extend entirely to the outer ring 16, but only about three-fourths or four-fifths the distance, leaving the outer ends between the spokes open. Upon the advance spoke of each pair a flap 19 is hinged so that when rotating to lift with a positive angle of incidence, it lifts up under the second or trailing next succeeding spoke. From this it will be understood that should the power be cut off from the wheel or propeller, and it rotates in the reverse direction due to rapid descent, these flaps 19 immediately drop down and swing beneath the next spoke of the next pair, thus presenting a positive angle of incidence and checking the descent of the wheel, due to the rotation of the same by the upward rush of air, thus the flaps 19 serve as a part of the working surface of each propeller blade while the same is lifting, and when the same rotates in reverse direction due to falling and rapid on-rush of air, these flaps swing to the other side, acting again as positive lifting elements to counteract the rotation and descent of the wheel.

Figure 5:
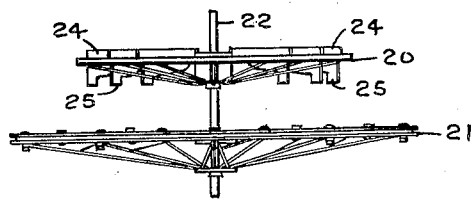

Referring now more particularly to Figs. 4 and 5, it will be seen that upper and lower wheels 20, 21 are provided for rotation upon the same shaft 22. The upper wheel is provided with a hub 23 and outer ring 20, connected by spokes such as 23. Propeller blades in the form of flaps 24 are hinged upon each spoke and extend from the hub 23 to the ring 20. These are substantially triangular in plan view as shown, and each flap or blade has a laterally projecting portion 25 which, when the flap swings upon the spoke, engages beneath the next spoke to the right or the left thereof, it being understood that the spokes are separated vertically at the hub and alternate at the ring, thus when the upper wheel rotates in one direction it presents a positive angle of incidence or lifting effect, and likewise when rotating in reverse direction, each propeller blade or flap swinging oppositely, again presents a positive angle of incidence or lifting effect. The under wheel 21 extends beyond the upper wheel, being of larger diameter, the spokes being arranged very much in the same manner and between each succeeding pair of spokes are flaps 26, which extend from the outer ring 21 inwardly slightly beyond the upper ring 20. When rotating in one direction these flaps 26 present a positive angle of incidence and lifting effect, but when the shaft 22 is released, and the large wheel 21 runs free, the flaps or blades 24 of the upper wheel swing upwardly against the trailing spokes, presenting a positive angle of incidence to retard and check the descent of the machine.

In Figs. 6 and 8 a somewhat different arrangement of lifting wheels, such as that shown in Fig. 3, is disclosed, and Figs. 9 and 10 a further modification, showing four wheels extending transversely across the machine instead of two, as shown in Fig. 6 and in straight line arrangement instead of at four corners as shown in Fig. 8.

Suitable driving means for, say two wheels, such as shown in Fig. 6 is illustrated in Fig. 7, where 27 indicates the frame of the machine, and 28, 29 the two lifting wheels or propellers, the peripheries of each of which are preferably grooved as indicated at 30, and are traversed by a continuous cable, such as indicated at 31. This cable travels clockwise with the wheel 28, passing downwardly over the grooved pulley 32 and upwardly beneath the grooved pulley 33, and upwardly over the grooved pulley 34, passing through the groove 30 in the wheel 29, leaving the same at 35 where it passes leftwardly over the pulley 36 and downwardly beneath the pulley 37, then upwardly over the pulley 38 into the groove 30 of the wheel 28 again, where it appears at the point of the beginning indicated by the reference character 31, thus both wheels may be operated simultaneously and by a continuous cable or other form of transmission from the engine or power shaft 40.

As an illustration of a desirable form of machine for the mounting of these wheels or propellers, by reference to the plan view shown in Fig. 6, it will be seen that at the front a pair of flaps 41, 42 may be operated simultaneously as an elevator or independently for lateral balancing, and are preferably hinged to the horizontal surface 43. At the back of the machine a similar pair of flaps 44, 45 may be similarly operated and likewise a rudder 46 may be provided preferably extending upwardly from the chassis or frame of the machine.

Of course, it will be understood that various modifications may be made in the construction and arrangement of parts without departing from the spirit of the invention as claimed.

I claim:

1. In an air impelling device of the class described, blades adapted when said device is rotated to present themselves at a positive angle of incidence to the air and in combination therewith means for automatically changing the angle of incidence of some of said blade surface when the rotation of said propeller is reversed.

2. In an air impelling device of the class described, blades adapted when said device is rotated to present themselves at a positive angle of incidence to the air and in combination therewith means for automatically changing the angle of incidence of some said blade surface when the rotation of said propeller is reversed, said means including a pivotal mounting for one of said blades extending in a direction longitudinally thereof.

3. In a craft of the class described, a rotatable lifting element, having an outer ring and a central hub-like portion, spokes extending alternately from points longitudinally spaced with relation to said hub to points on said ring, and surfaces extending between successive pairs of said spokes.

4. In a craft of the class described, a rotatable lifting element, having an outer ring and a central hub-like portion, spokes extending alternately from points longitudinally spaced with relation to said hub to points on said ring, and surfaces extending between successive pairs of said spokes, said surfaces spaced from said ring, and other surfaces hinged to alternate spokes adapted to present a positive or negative angle of incidence according to the direction of rotation of said element.

5. In combination revolving airfoil surfaces of an aircraft, a surface having a fixed angle of incidence and a surface having a changeable angle of incidence, said second mentioned surface being adapted to adjust itself by a change in the speed of rotation of said surfaces so as to partially restore the reduced lift of said first mentioned surface.

6. In combination revolving airfoil surfaces of an aircraft, a surface having a fixed angle of incidence and a surface having a changeable angle of incidence, said second mentioned surface being adapted to adjust itself by a change in the speed of rotation of said surfaces so as to retard falling of said craft.

In testimony whereof I hereunto affix my signature.

WILBUR R. KIMBALL.